(12) United States Patent
Peterson et al.

(10) Patent No.: US 9,753,577 B2
(45) Date of Patent: Sep. 5, 2017

(54) METHODS AND APPARATUS TO PERFORM A DETECTION OPERATION

(75) Inventors: Jonathan R. Peterson, Everett, WA (US); Cole Wilson, Everett, WA (US); Thomas Fuller, Seattle, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 25 days.

(21) Appl. No.: 13/340,971

(22) Filed: Dec. 30, 2011

(65) Prior Publication Data

US 2013/0169519 A1 Jul. 4, 2013

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 5,995,657 A | 11/1999 | Sunakawa | |
| 2007/0229466 A1 | 10/2007 | Peng et al. | |
| 2010/0097355 A1* | 4/2010 | Jang et al. | 345/178 |
| 2010/0212974 A1* | 8/2010 | Kim | 178/18.03 |
| 2010/0245286 A1 | 9/2010 | Parker | |
| 2011/0050634 A1* | 3/2011 | Lin | G06F 3/0416 345/174 |
| 2011/0057890 A1* | 3/2011 | Goo et al. | 345/173 |
| 2011/0175834 A1 | 7/2011 | Han et al. | |
| 2011/0261007 A1* | 10/2011 | Joharapurkar | G06F 3/0418 345/174 |
| 2013/0044064 A1* | 2/2013 | Chan | 345/173 |
| 2014/0002400 A1* | 1/2014 | Christiansson et al. | 345/173 |

OTHER PUBLICATIONS

International Search Report for Application No. PCT/US2012/053230 dated Nov. 28, 2012; 2 pages.
Written Opinion of the International Searching Authority for International Application No. PCT/US2012/053230 dated Nov. 28, 2012; 8 pages.
Cypress, 2nd Office Action, CN2012103131120.8, Oct. 28, 2015, 7 pgs.
Cypress, 3rd Office Action, CN2012103131120.8, Mar. 31, 2016, 6 pgs.
Parade Technologies Ltd., Certificate of Patent, CN2012103131120.8, dated Dec. 21, 2016, 6 pgs.

* cited by examiner

*Primary Examiner* — Amr Awad
*Assistant Examiner* — Donna Lui
(74) *Attorney, Agent, or Firm* — Morgan, Lewis & Bockius LLP

(57) ABSTRACT

A method and apparatus determine a difference value, the determined difference value reflecting a difference between a plurality of presence values. In an embodiment, the method and apparatus perform an operation associated with the plurality of presence values, based on the determined difference value.

15 Claims, 15 Drawing Sheets

METHODS AND APPARATUS TO PERFORM A DETECTION OPERATION

TECHNICAL FIELD

The subject matter relates to the field of interpreting user input. More specifically, but not by way of limitation, the claimed subject matter discloses techniques of performing a detection operation.

BACKGROUND

Computing devices, such as notebook computers, personal digital assistants, mobile communication devices, portable entertainment devices (e.g., handheld video game devices, multimedia players), and set-top-boxes (e.g., digital cable boxes, digital video disc (DVD) players) may include user interface devices that facilitate interaction between a user and the computing device.

One type of user interface device that has become more common operates by way of capacitance sensing. A capacitance sensing system may include a touchscreen, touch-sensor pad, a touch-sensor slider, or touch-sensor buttons, and may include an array of one or more capacitive sensor elements. Capacitive sensing typically involves measuring a change in capacitance associated with the capacitive sensor elements to determine a presence conductive object relative to the capacitive sensor elements. The measured changes in capacitance may be used to calculate a centroid that indicates position of the conductive object. The conductive object may be, for example, a stylus or a user's finger.

Noise signals from various sources may affect accuracy and consistency in detecting a presence of a conductive object. When a detected presence is used to determine further information about a conductive object, such as the position of a conductive object, the noise may also affect the accuracy and consistency of that further information.

BRIEF DESCRIPTION OF THE DRAWINGS

Some embodiments are illustrated by way of example and not limitation in the figures of the accompanying drawings in which.

DETAILED DESCRIPTION

Methods and apparatus to perform s detection operation are discussed. In the following description, for purposes of explanation, numerous examples are set forth in order to provide a thorough understanding of embodiments. It will be evident to one skilled in the art that the claimed subject matter may be practiced in other embodiments.

The detailed description discloses examples of technology that, among other things, determines differences between presence values detected by a sensing system. The difference may be used to provide various different detection operations. Some embodiments are now briefly introduced and then discussed in more detail along with other embodiments beginning with FIG. 1.

In an embodiment, a finger is used to provide input to a touchscreen that is organized into regions of sensor elements. Presence values of the regions indicate proximity of the finger to the different regions. Electrical noise and other disruptive signals may cause these presence values to include error. Error affected presence values result in less accurate presence detection and position calculation. In one aspect, differences between presence values are used to identify and then filter out or modify those presence values affected by error. More accurate presence values provide more accurate presence detection of the finger. The more accurate detected presence can then be used to calculate a more accurate position.

In another aspect, differences between presence values and/or differences between those differences are used to determine a position of the finger on the touchscreen. The techniques for position determination described herein can be less computationally expensive and more quickly executed than other methods of position calculation such as centroid equations that require division and/or multiplication.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

Figure 1:
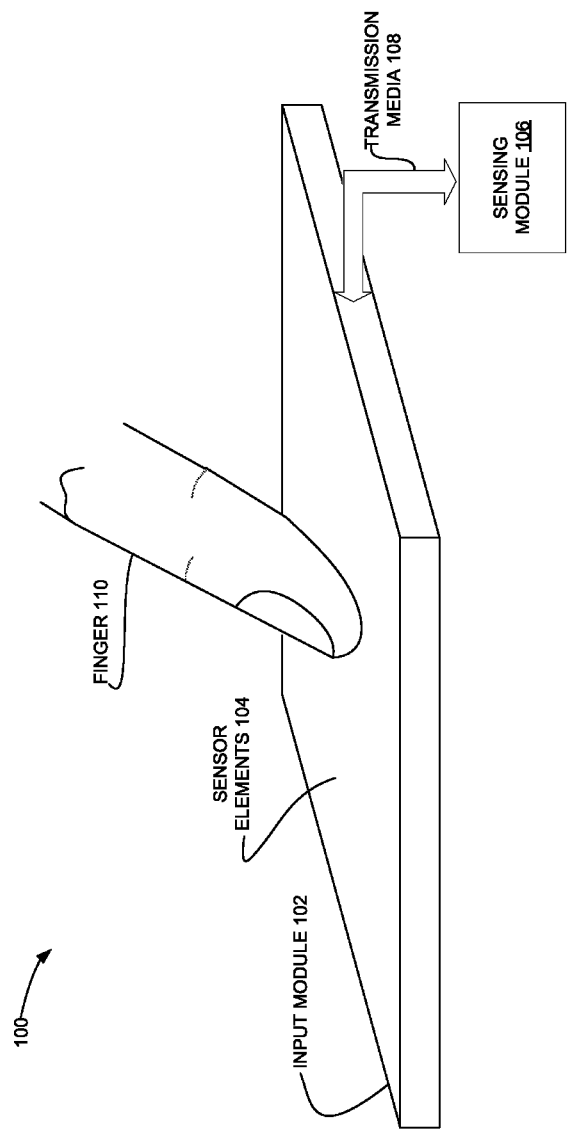
FIG. 1 is a block diagram illustrating an example sensing system, in accordance with various embodiments.

FIG. 1 is a block diagram illustrating an example sensing system 100, in accordance with various embodiments. The sensing system 100 is shown to include an input module 102 coupled to a sensing module 106.

The input module 102 is to receive input from an input object (e.g., a finger 110). The input module 102 may include a touch pad, a touchscreen, or any other interface to receive input from an input object. In various embodiments, the sensing system 100 may provide the functionality of a touchscreen, a touchpad, a slider, a button, a switch, a level sensor, a proximity sensor, a displacement sensor, a combination thereof, or provide some other functionality based on a detection of a user input.

The input module 102 is shown to include sensor elements 104. In various example embodiments, the sensor elements 104 may include one or more of light-sensitive elements, light emitting elements, photo-sensitive elements, pressure sensitive elements, and/or capacitive sensor elements. In some embodiments, the sensor elements are embedded into an image display of the input module 102. This is sometimes referred to as in-cell sensing. For example, a photosensitive element may be embedded into each display pixel of the image display. The photosensitive element senses light reflected by an input object back into the cell. As will be described with respect to FIG. 2, the sensor elements 104 may be organized into multiple regions of the input module 102.

A finger 110 is shown to be proximate to the input module 102 of FIG. 1 and is an example of an input object providing input to the input module 102. In various embodiments, the input object may be a non-conductive object, a conductive object (e.g., a finger or stylus) and/or may produce light or other energy (e.g., to be sensed through the sensor elements 104). The input object may be fixed in position or moveable in position relative to the input module 102. For example, a user may move the finger 110 relative to the input module 102. The user may include a human, a mechanism, a machine, and/or programmed instructions. Alternatively or additionally, the input module 102 may be allowed to move relative to a fixed or movable input object.

The sensing module 106 is to sense or detect a presence of one or more input objects proximate one or more of the sensor elements 104 of the input module 102. To this end, the sensing module 106 may perform scan operations to sense, through the sensing elements, signals reflecting pressure applied to the input module 102 through the input object, light (e.g., infrared light) associated with the input object, images of the input object, and/or capacitances of the sensor elements when the input object is present.

In an example scan operation, the sensing module 106 exchanges energy with the input module 102 through the transmission media 108. The transmission media 108 may include any medium through which the energy may be conveyed. For some embodiments, the transmission media 108 includes metal trace (e.g., copper wire) over which current can flow. Alternatively or additionally, the energy may be exchanged over a wireless transmission media. In one embodiment of a scan operation, the sensing module 106 applies a voltage to one or more of the sensor elements 104 (e.g., capacitive sensor elements) through the transmission media 108 to form a capacitance. The sensing module 106 may alternatively or additionally detect a current or voltage received from the one or more of the sensor elements 104.

As introduced above, the sensor elements 104 may be organized into different regions of the input module 102. A detected presence of the finger 110 over multiple regions of the input module 102 is discussed with respect to FIG. 2.

Figure 2:
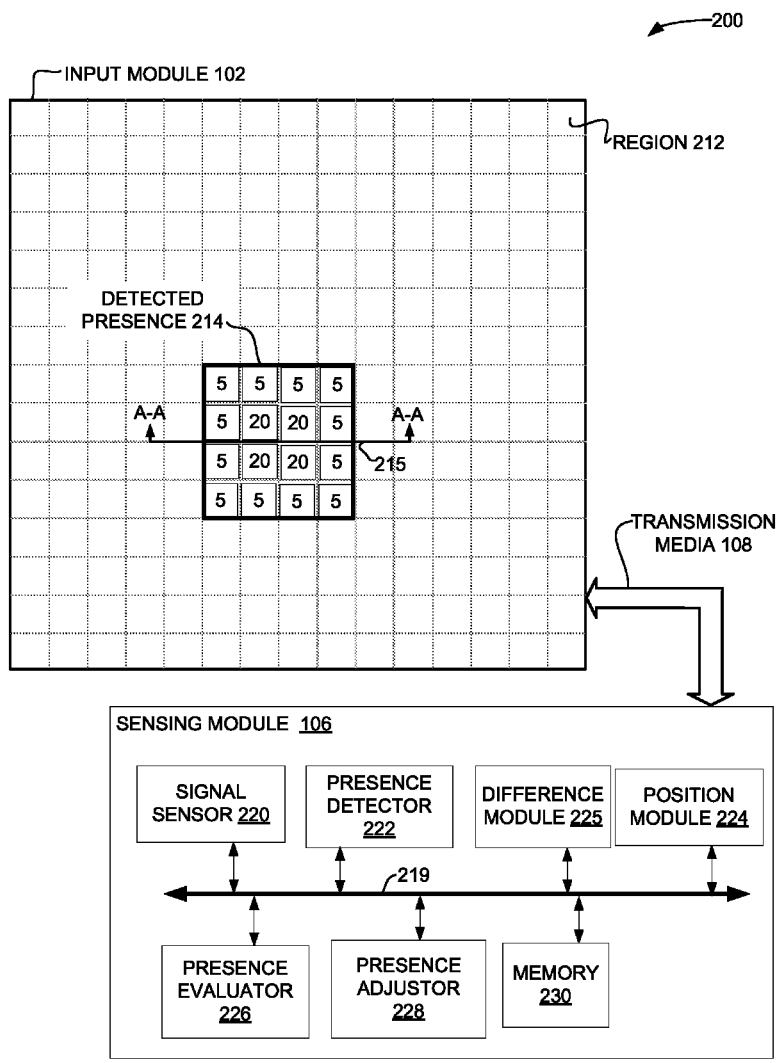
FIG. 2 is block diagram illustrating a detected presence, in accordance with an embodiment.

FIG. 2 is block diagram 200 illustrating a detected presence 214, in accordance with an embodiment. FIG. 2 is shown to include the input module 102 of FIG. 1 organized into a grid of regions. Each region is shown as a square, such as the region 212. It should be noted that in some embodiments, the size, shape, and organization of regions may be different from those shown in FIG. 2 without departing from the claimed subject matter.

The input module 102 is shown to include a detected presence 214, which is a representation of the finger 110 proximate to the input module 102. For example, the detected presence 214 may be thought of as a snapshot of the finger 110 taken by the sensing module 106. The detected presence 214 is shown as a number of neighboring regions of the input module 102, where each region of the detected presence 214 includes a presence value. The presence value represents a level or measure of presence of the finger 110 in a particular region. For example, each presence value may represent a change in capacitance detected by the sensing module 106 that meets or exceeds a threshold change in capacitance value.

The sensing module 106 is shown to include a signal sensor 220, a presence detector 222, a position module 224, a difference module 225, a presence evaluator 226, a presence adjustor 228, and a memory 230 coupled to one another through a bus 219, which each may be implemented using hardware, software, or a combination of hardware and software.

In an embodiment, the signal sensor 220 is to communicate with the input module 102 over the transmission media 108 to detect capacitance of the sensor elements 104. For example, the signal sensor 220 may perform scan operations described above with respect to FIG. 1 to detect the capacitance. Alternatively or additionally, the signal sensor 220 may receive signals, responsive to the input object, reflecting pressure, light, and/or images of the input object. Signal sensing and presence detection are discussed below with respect to capacitive sensor elements for illustration and not limitation.

In an embodiment, the sensor elements within the regions of the detected presence 214 provide capacitance signals corresponding to an x-axis defined for the input module 102 and a y-axis defined for the input module 102. In an embodiment, the signal sensor 220 includes an analog-to-digital conversion circuit to convert analog capacitance signals to digital capacitance signals, which are used by the presence detector 222 to detect presence.

The presence detector 222 is to detect a presence of the finger 110 of FIG. 1 using signals (e.g., digital signals) received from the signal sensor 220. In an embodiment, the presence detector 222 determines presence values in different regions, represents each presence value with a numerical value (e.g., as shown in the regions of the detected presence 214), and may detect the presence of the finger 110 of FIG. 1 in the regions where presence values have been determined. A presence value may include error due to a noise signal (e.g., electrical noise).

In one embodiment, the presence detector 222 determines a presence value through comparing a capacitance value of a region of capacitive sensor elements when the finger 110 is not present (e.g., not proximate with a capacitive sensor element), with the capacitance value of the region of capacitive sensor elements when the finger 110 is present.

The detected presence 214 is shown to include relatively greater presence values (e.g., 20) around the center of the detected presence 214 where the proximity of the finger 110 is closest. The detected presence 214 is shown to include relatively smaller presence value (e.g., 5) surrounding the relatively greater presence values. The presence values of 20 and 5 are included for illustration and not limitation. In an embodiment, the detected presence 214 includes presence values not affected by noise signals.

Having one or more relatively greater presence values surrounded by relatively lower presence values (e.g., as is the case with the detected presence 214) may be characteristic of a detected presence for an input object (e.g., when the presence values of the detected presence 214 are unaffected by noise). However, characteristic magnitude and distribution of presence values may depend on the input object, (e.g., the finger 110), how the input object is applied (e.g., finger tip only versus length of finger), types of sensor elements (e.g., capacitive sensor elements), organization of regions of sensor elements, the presence or absence of noise, and/or other parameters relating to input.

In various embodiments, differences between the presence values (e.g., unaffected by noise signals) of a detected presence (e.g., the detected presence 214) may also be characteristic of an input object. These differences (e.g., difference values) may be used as references to compare with difference values of another detected presence as part of a process for detecting noise.

The difference module 225 is to determine a difference between presence values of a detected presence. In an embodiment, the difference may be found through subtraction of one presence value from another presence value. As will be discussed below, the difference module 225 can reveal patterns of reference difference values (e.g., of the detected presence 214) and patterns of determined difference values (e.g., of another detected presence being tested for noise).

The presence evaluator 226 is to determine whether a detected presence includes error signals. For example, the presence evaluator 226 may access one or more reference difference values, placed in memory 230 by the difference module 225, so that the presence evaluator 226 can determine a level of similarity to one or more determined difference values of a detected presence. In an embodiment, the presence evaluator 226 determines that a presence value of a detected presence includes error (e.g., due to noise) if the level of similarity does not meet or exceed a threshold similarity level.

The presence adjustor 228 is to adjust, modify, and/or filter a presence value determined to include error by the presence evaluator 226. Embodiments discussed below with respect to FIGS. 3-11 further explain how the difference module 225, the presence evaluator 226, and the presence adjustor 228 can operate to help mitigate the effects of noise signals on a detected presence.

The position module 224 uses the presence values of a detected presence to calculate a position of the detected presence relative to the input module 102. For example, the calculated position may be expressed as a point in an X-Y coordinate system defined for the input module 102 of FIG. 1. However, the position may be expressed with more or less than two-dimensions in other embodiments.

In an embodiment, the position module 224 calculates position of the detected presence based on differences between detected presence values determined by the difference module 225. For example, as discussed with respect to FIGS. 12-14, the position of a detected presence may be designated at a location where the difference module 225 finds a minimum difference between presence values of the detected presence. Alternatively or additionally, the position module 224 uses a centroid algorithm to determine calculate the position.

As introduced above, difference values may be used as references to compare with difference values of a detected presence as part of a process for detecting noise. Reference difference values between the presences values are now discussed with respect to FIG. 3.

Figure 3:
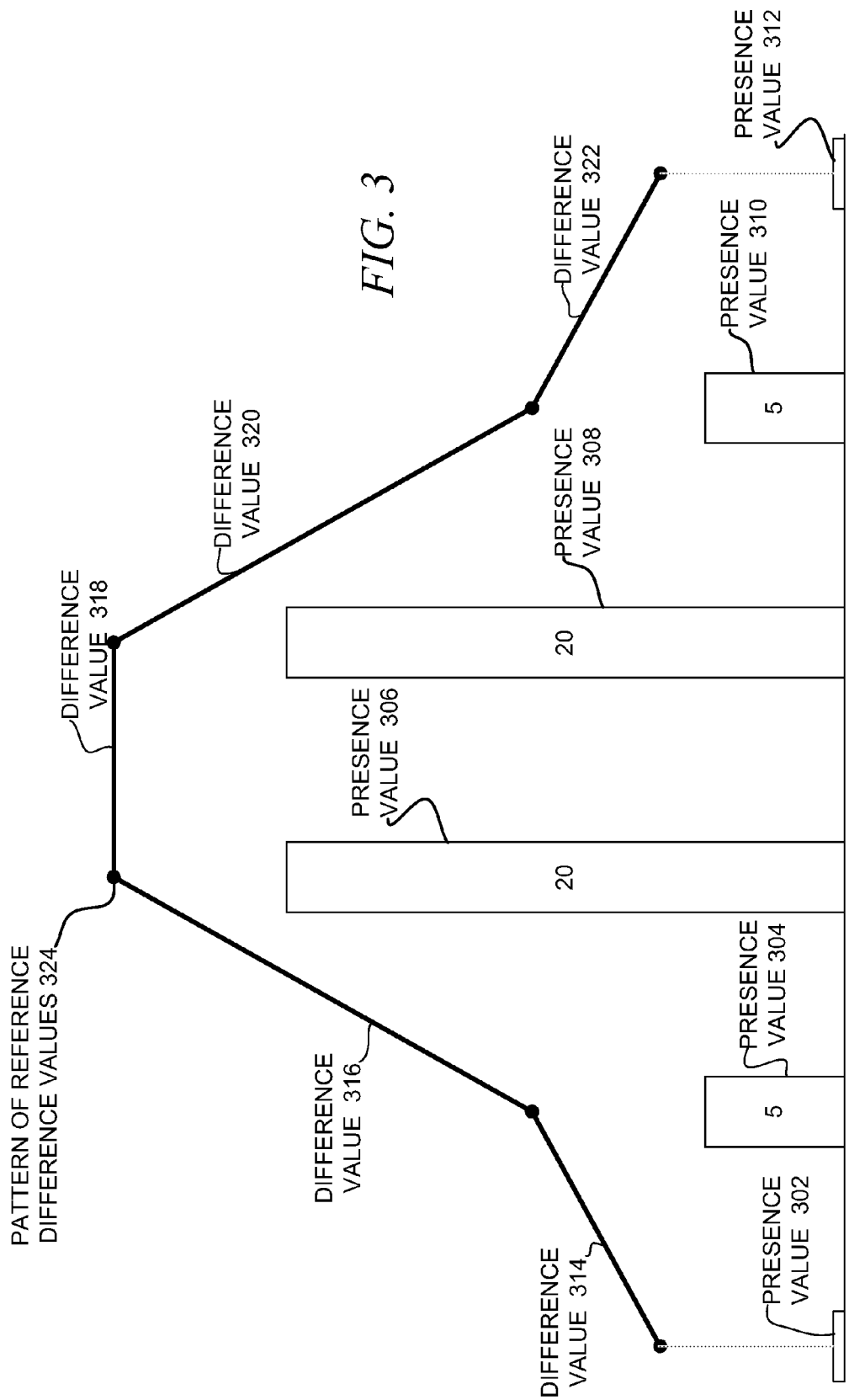
FIG. 3 is a graph illustrating a pattern of reference difference values, in accordance with an embodiment.

FIG. 3 is a graph illustrating a pattern of reference difference values 324, in accordance with an embodiment. The graph is shown to include the presence values 302, 304, 306, 308, 310, and 312 along the section A-A 215 of FIG. 2. When the presence values of the detected presence 214 of FIG. 2 are characteristic of input provided by the finger 110 of FIG. 1, differences between those presence values may also be characteristic of the input provided by the finger 110.

In an embodiment, the difference module 225 of FIG. 2 determines difference values representing differences between adjacent presence values 302, 304, 306, 308, 310, and 312 to determine the pattern of reference difference values 324. For example, the difference value 314 represents the difference (e.g., 5) between the presence value 302 and the presence value 304, the difference value 316 represents the difference (e.g., 15) between the presence value 304 and the presence value 306, the difference value 318 represents the difference (e.g., 0) between the presence value 306 and the presence value 308, the difference value 320 represents the difference (e.g., 15) between the presence value 308 and the presence value 310, and the difference value 322 represents the difference (e.g., 5) between the presence value 310 and the presence value 312. The use of the pattern of reference difference values 324 to identify error in a presence value is now discussed with respect to FIG. 4.

Figure 4:
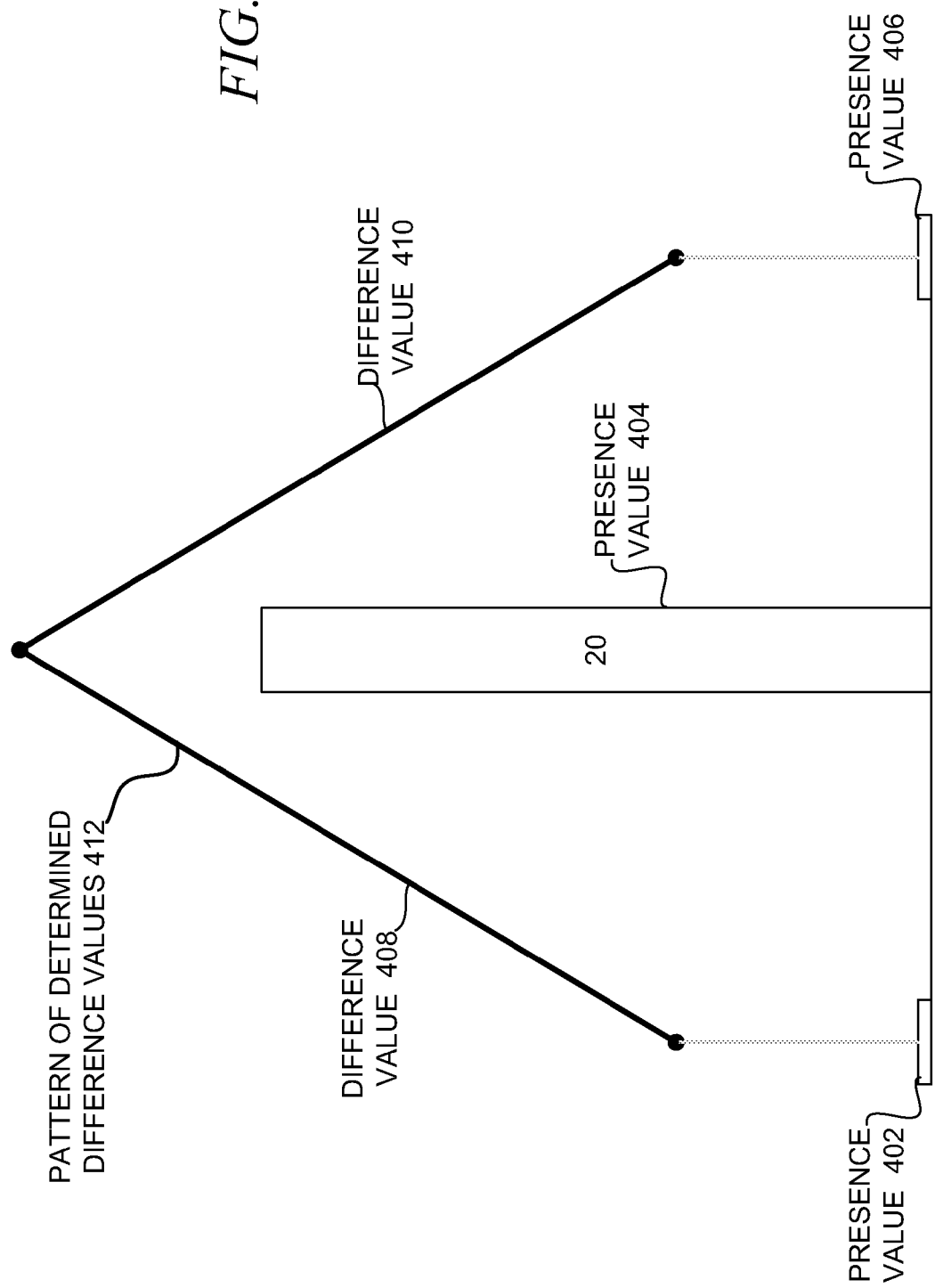
FIG. 4 is a graph illustrating a pattern of determined difference values, in accordance with an embodiment.

FIG. 4 is a graph illustrating a pattern of determined difference values 412, in accordance with an embodiment. The graph is shown to include the presence value 402, the presence value 404, and the presence value 406. The difference value 408 represents the difference (e.g., 20) between the presence value 402 and the presence value 404, while the difference value 410 represents the difference (e.g., 20) between the presence value 404 and the presence value 406.

As introduced above, the pattern of determined difference values 412 may be compared to the pattern of reference difference values 324 of FIG. 3 to determine whether a detected presence includes error. To this end, once the difference module 225 of FIG. 2 has determined the difference values 408 and 410, the presence evaluator 226 of FIG. 2 may determine a level of similarity between one or more of the determined difference values 408 and 410 to one or more of the reference difference values 314, 316, 318, 320, and 322 of FIG. 3.

In an embodiment, levels of similarity between a determined difference value and a reference difference value depend on the number of units between them. For example, where the values differ within the range of four to five units, a low level of similarity may be designated. Where the values differ within the range of 1-3 units, a high level of similarity may be designated. In an embodiment, the presence evaluator 226 of FIG. 2, determines that the difference value 408 (e.g., 20) of FIG. 4 has a low level of similarity to the difference value 316 (e.g., 15) of FIG. 3 because of the number of units between them (e.g., 5).

Alternatively or additionally, the presence evaluator 226 of FIG. 2 may determine a level of similarity between the pattern of determined difference values 412 of FIG. 4 and the pattern of reference difference values 324 of FIG. 3. In an embodiment, a pattern of determined differences is designated the level of similarity equal to the lowest level of similarity between difference values.

In an embodiment, when the presence evaluator 226 of FIG. 2 determines the low level of similarity, the presence adjustor 228 of FIG. 2 may remove or filter out the presence value 404 of FIG. 4 as noise (e.g., a false positive presence value). It should be noted that the presence adjustor 228 of FIG. 2 may filter presence values responsive to other identified levels of similarity without departing from the claimed subject matter.

Figure 5:
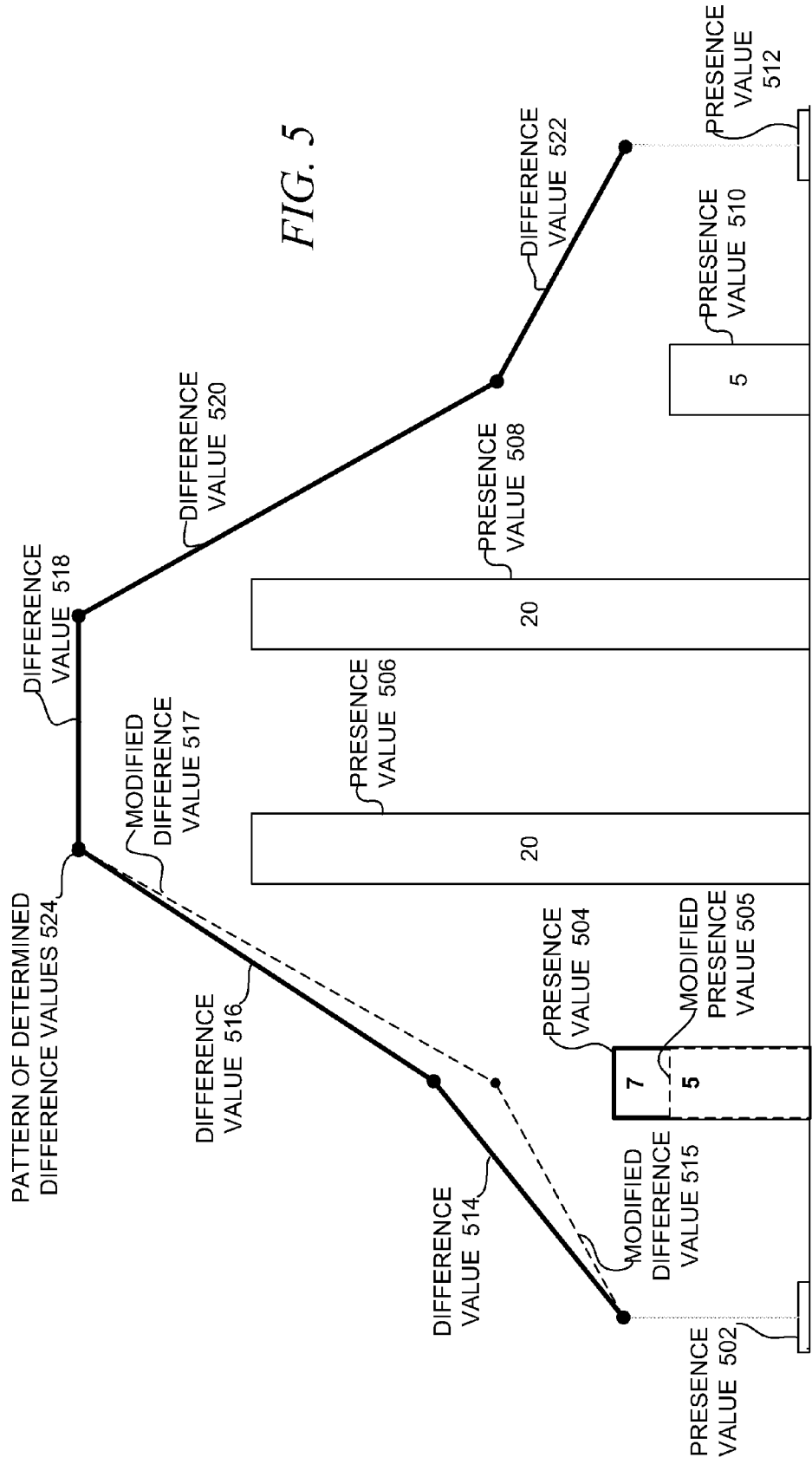
FIG. 5 is a graph illustrating another pattern of determined difference values, in accordance with an embodiment.

With respect to FIG. 5 an example is discussed where one portion of a pattern of determined difference values follows the pattern of reference difference values 324 of FIG. 3 but another portion does not.

FIG. 5 is a graph illustrating another pattern of determined difference values 524, in accordance with an embodiment. The graph is shown to include presence values 502, 506, 508, 510, and 512 that are the same as the presence values 302, 306, 308, 310, and 312 of FIG. 3, and also shown to include a presence value 504 that is not the same as the presence value 304 of FIG. 3. As a result, for a detected presence being tested for noise, the difference module 225 of FIG. 2 determines the difference values 514, 516, 518, 520, and 522 of FIG. 5.

The presence evaluator 226 of FIG. 2 may determine that the pattern of determined difference values 524 does not follow the pattern of reference difference values 324 of FIG. 3 because the difference values 514 and 516 of FIG. 5 are not the same as the difference values 314 and 316 of FIG. 3. The dissimilarity may indicate that the presence value 504 of FIG. 5 includes error and in embodiment, it is the error of the presence value 504 that causes the pattern of determined difference values 524 to stray from the pattern of reference difference values 324 of FIG. 3.

In an embodiment, the presence evaluator 226 of FIG. 2 designates a high level of similarity to the pattern of determined difference values 524 because the number of units between the difference value 514 (e.g., 7) of FIG. 5 and the difference value 314 (e.g., 5) of FIG. 3 is within the range of 1-3 units, and the number of units between the difference value 516 (e.g., 13) of FIG. 5 and the difference value 316 (e.g., 15) of FIG. 3 is also within the range of 1-3 units.

In an embodiment, based on the presence evaluator 226 of FIG. 2 determining the high level of similarity, the presence adjustor 228 of FIG. 2 modifies the presence value 504 to a modified presence value 505 that results in the modified difference values 515 and 517. As can be seen in FIG. 5, the modified difference values 515 and 517 along with the difference values 518, 520, and 522 of FIG. 5 results in a pattern that matches the pattern of reference difference values 324 of FIG. 3. In this way, the detected presence can be modified to mitigate the effect of noise.

Figure 6:
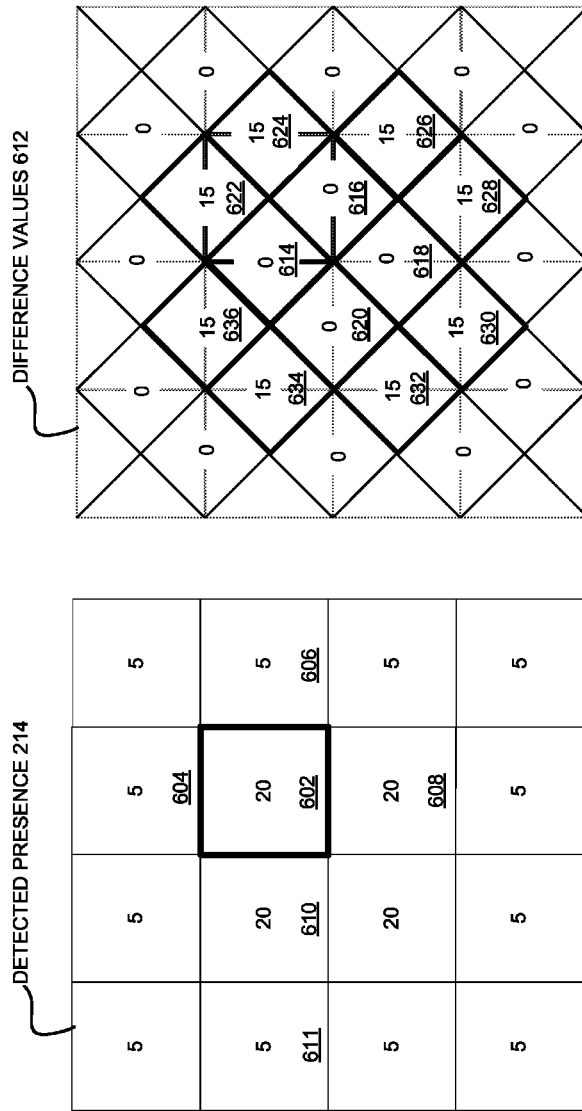
FIG. 6 is a block diagram illustrating a detected presence and corresponding difference values, in accordance with an embodiment.
Figure 7:
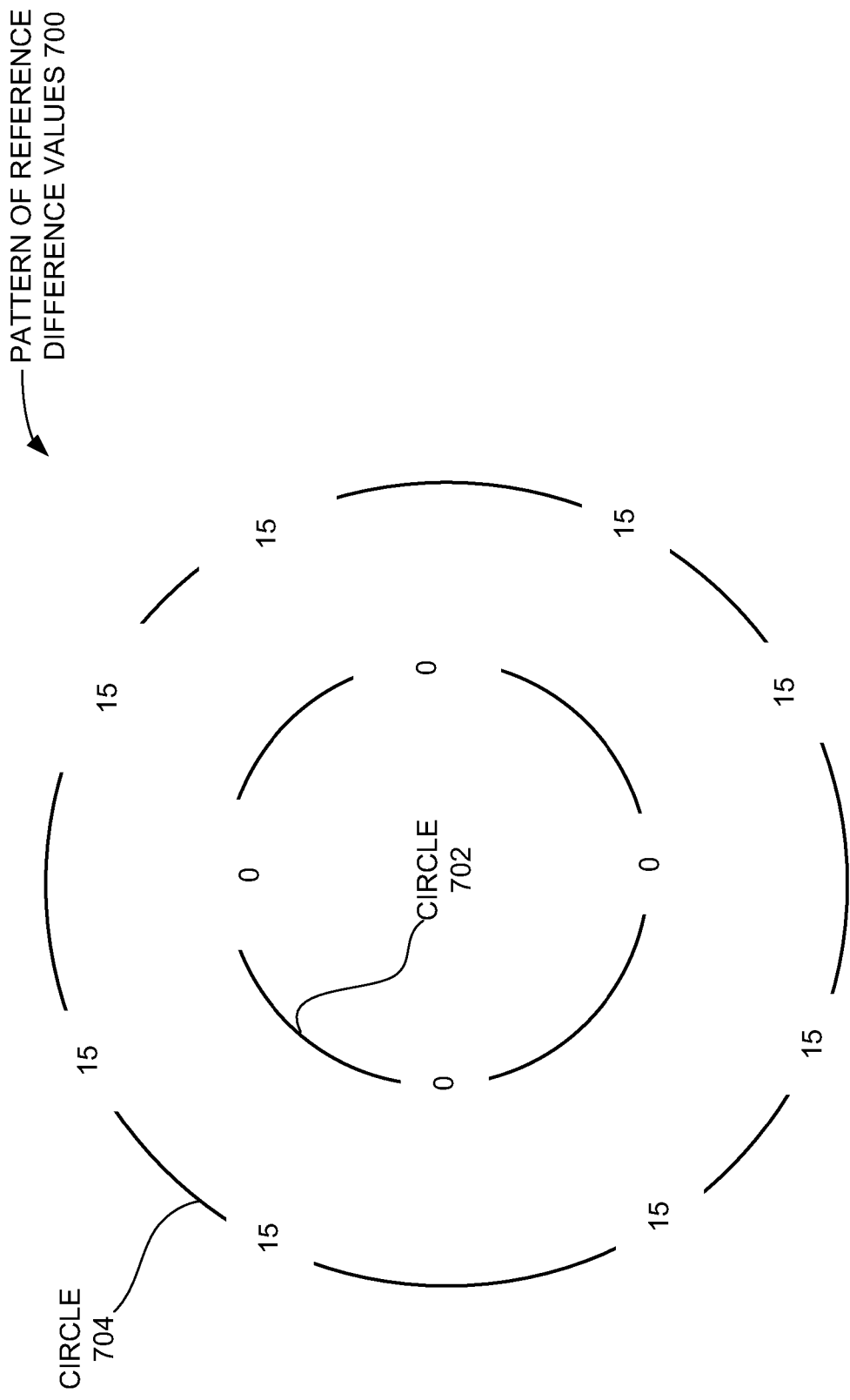
FIG. 7 is a block diagram illustrating a pattern of reference difference values, in accordance with an embodiment.

FIG. 3 described a pattern of reference difference values 324 with respect to a one-dimensional profile of presence values. FIGS. 6 and 7 introduce a pattern of reference difference values with respect to a two-dimensional top view of presence values.

FIG. 6 is a block diagram illustrating the detected presence 214 and corresponding difference values 612, in accordance with an embodiment. As discussed with respect to FIG. 2, the detected presence 214 may represent the finger 110 of FIG. 1 and the presence values may represent changes in capacitance unaffected by noise signals.

The difference values 612 are shown to include multiple sub-regions including difference values. The sub-regions appear to be overlaid on the regions of the detected presence 214. In an embodiment, the difference module 225 of FIG. 2 determines the difference values for adjacent presence values of the detected presence 214. An example of locations of sub-regions and their difference values is provided below with respect to the presence value of the region 602 and the presence values of the regions 604, 606, 608, and 610 adjacent to the region 602. It should be noted that regions and sub-regions having other shapes and arrangements may be used without departing from the claimed subject matter.

The sub-region 622 is shown to include equal portions of the regions 602 and 604 and includes a difference value (e.g., 15) representing the difference between the presence value (e.g., 20) of the region 602 and the presence value (e.g., 5) of the region 604. The sub-region 624 is shown to include equal portions of the regions 602 and 606 and includes a difference value (e.g., 15) representing the difference between the presence value (e.g., 20) of the region 602 and the presence value (e.g., 5) of the region 606. The sub-region 616 is shown to include equal portions of the regions 602 and 608 and includes a difference value (e.g., 0) representing the difference between the presence value (e.g., 20) of the region 602 and the presence value (e.g., 20) of the region 608. The sub-region 614 is shown to include equal portions of the regions 602 and 610 and includes a difference value (e.g., 0) representing the difference between the presence value (e.g., 20) of the region 602 and the presence value (e.g., 20) of the region 610.

The sub-regions 614, 616, 622, and 624 just described as well as the sub-regions 618, 620, 626, 628, 630, 632, 634, and 636 are discussed with respect to FIG. 7 where a pattern of reference difference values extracted from the difference values is introduced.

FIG. 7 is a block diagram illustrating a pattern of reference difference values 700, in accordance with an embodiment. FIG. 7 is shown to include the circle 702 and the circle 704. In an embodiment, the circles 702 and 704 are concentric. In an embodiment, the difference module 225 of FIG. 2 extracts the pattern of reference difference values 700 from the difference values 612 of FIG. 6. Referring to FIGS. 6 and 7, the difference values (e.g., zero) of the circle 702 are shown in the sub-regions 614, 616, 618, and 620, while the difference values (e.g., 15) of the circle 704 are shown in the sub-regions 622, 624, 626, 628, 630, 632, 634, and 636.

In an embodiment, the pattern of reference difference values 700 is used by the presence evaluator 226 of FIG. 2 as points of comparison to patterns of determined differences (e.g., associated with another detected presence). An example of such a comparison is discussed with respect to FIG. 9. Another detected presence (e.g., to be tested for error) and the difference values from which the pattern of determined difference values are extracted are discussed with respect to FIG. 8.

Figure 8:
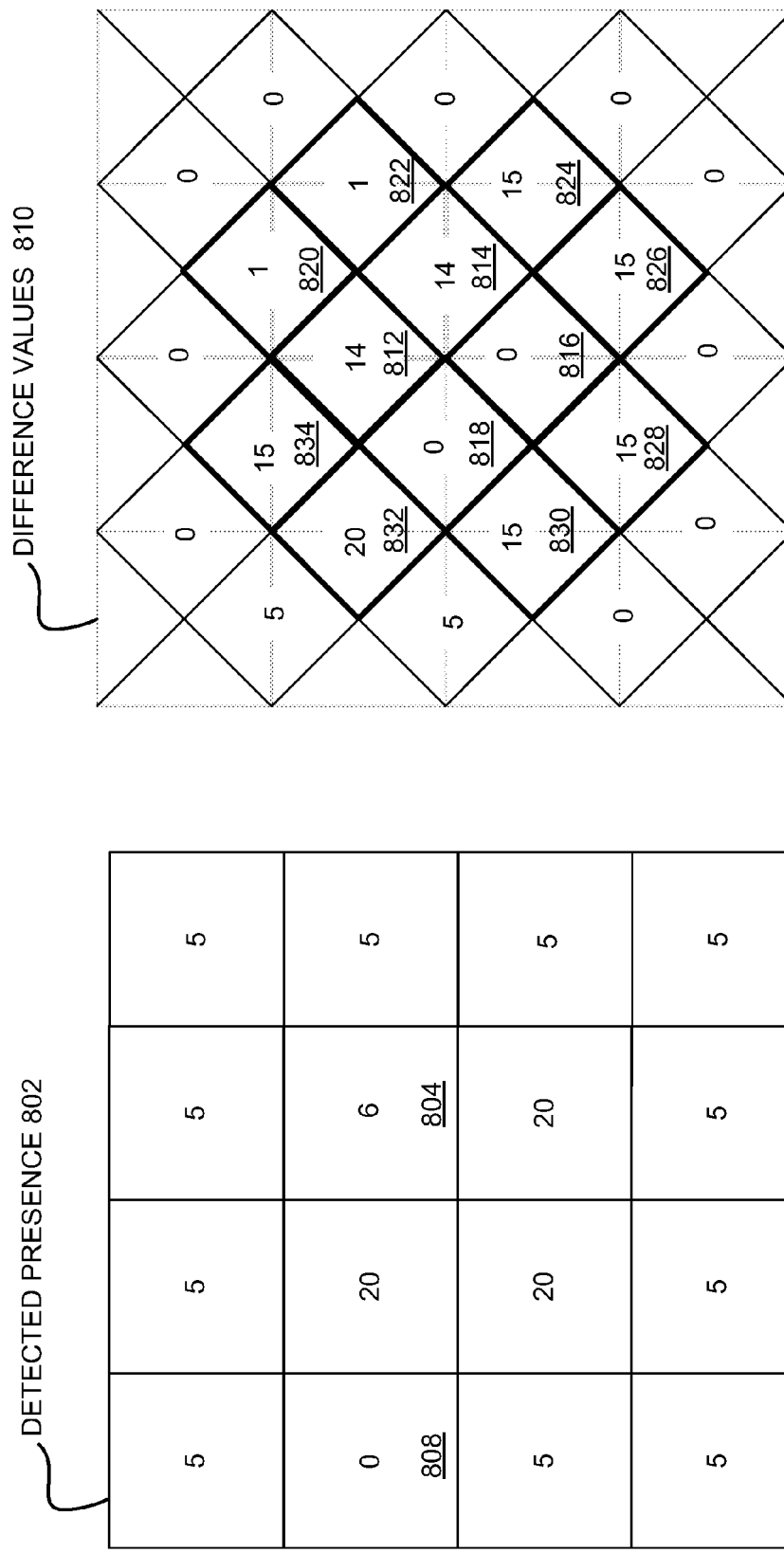
FIG. 8 is a block diagram illustrating another detected presence and corresponding difference values, in accordance with an embodiment.

FIG. 8 is a block diagram illustrating another detected presence 802 and corresponding difference values 810, in accordance with an embodiment. The detected presence 802 of FIG. 8 is not the same as the detected presence 214 of FIG. 6. For example, although the detected presences 802 and 214 have the same number and geometric distribution of regions, the regions 804 and 808 of the detected presence 802 have values of six and zero, respectively, while the regions 602 and 611 of the detected presence 214 have values of 20 and five, respectively. In an embodiment, the presence values of the regions 602 and 611 may include a noise signal or be otherwise lacking in accuracy.

In embodiment, the difference module 225 determines differences between presence values of adjacent regions. The difference values 810 are shown to include sub-regions 812, 814, 816, 818, 820, 822, 824, 826, 828, 830, 832, and 834 including the differences (e.g., difference values) between presence values of the detected presence 802. These sub-regions are discussed in more detail with respect to FIG. 9.

Figure 9:
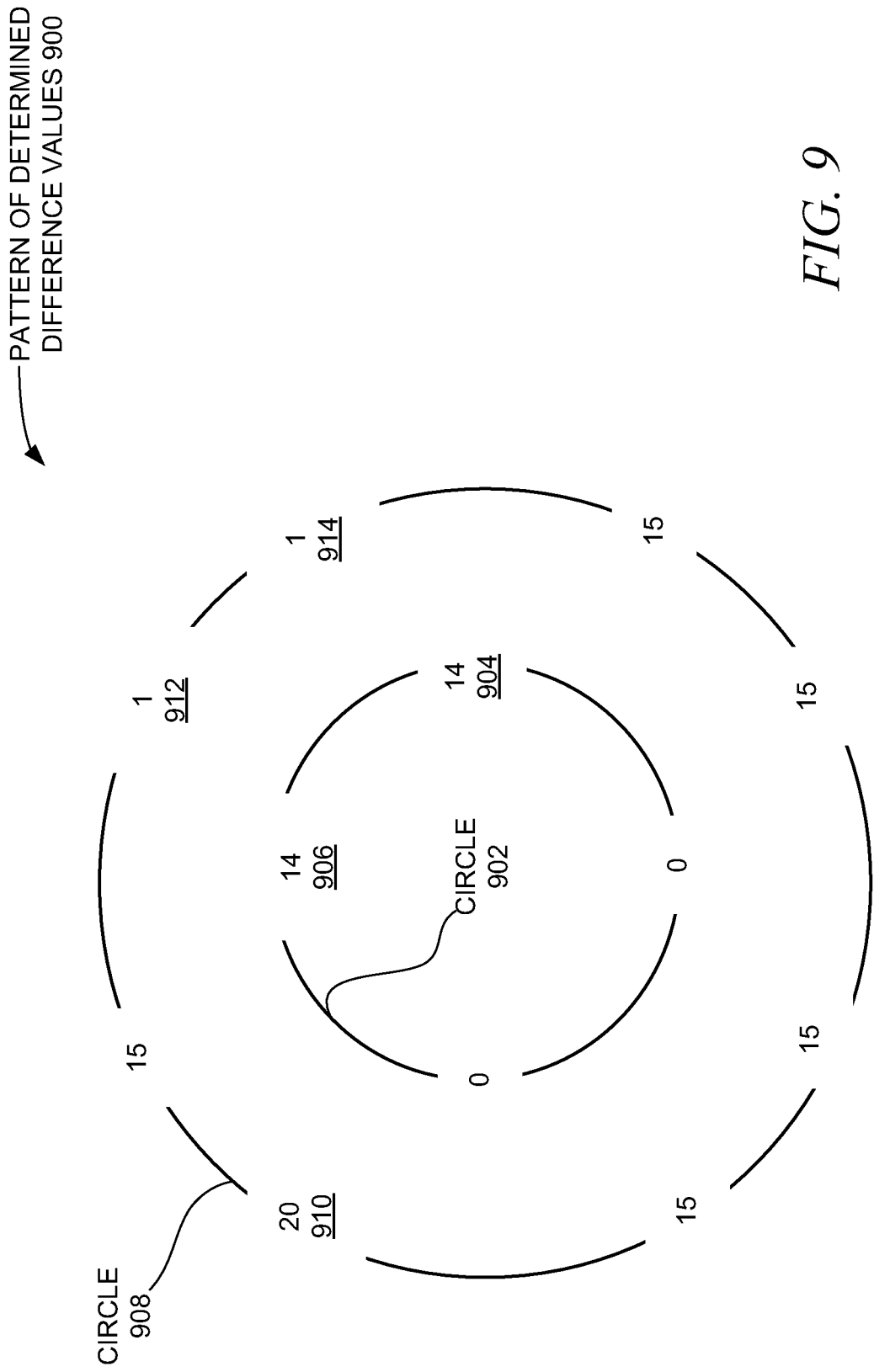
FIG. 9 is a block diagram illustrating another pattern of determined difference values, in accordance with an embodiment.

FIG. 9 is a block diagram illustrating a pattern of determined difference values 900, in accordance with an embodiment. FIG. 9 is shown to include the circle 902 and the circle 908 as example patterns of determined difference values extracted from the difference values 810 of FIG. 8 by the difference module 225 of FIG. 2. Referring to FIG. 8, the difference values of the sub-regions 812, 814, 816, and 818 correspond to the difference values 14, 14, zero, and zero, respectively, in the circle 902. The difference values of the sub-regions 820, 822, 824, 826, 828, 830, 832, and 834 correspond to the difference values of one, one, 15, 15, 15, 15, 20, and 15, respectively, in the circle 908.

In an embodiment, the presence evaluator 226 of FIG. 2 determines, based on a level of similarity between the difference values 904 and 906 (e.g., 14 and 14) of the circle 902 of FIG. 9 and the reference difference values (e.g., zero and zero) of the circle 702 of FIG. 7 that the presence value (e.g., six) in the region 804 of the detected presence 802 is in error. Likewise, the presence evaluator 226 of FIG. 2 may determine based on a level of similarity between difference values 912, 914, and 908 (e.g., one, one and 20) of the circle 908 of FIG. 9 and the reference difference values (e.g., 15, 15, and 15) of the circle 704 of FIG. 7 that the presence value (e.g., zero) in the region 808 of the detected presence 802 includes error.

As described above, presence values found by the presence evaluator 226 to include error may be modified by the presence adjustor 228 of FIG. 2 to account for the error. Modification of the presence values of the regions 804 and 808 of FIG. 8 is now described with respect to FIG. 10.

Figure 10:
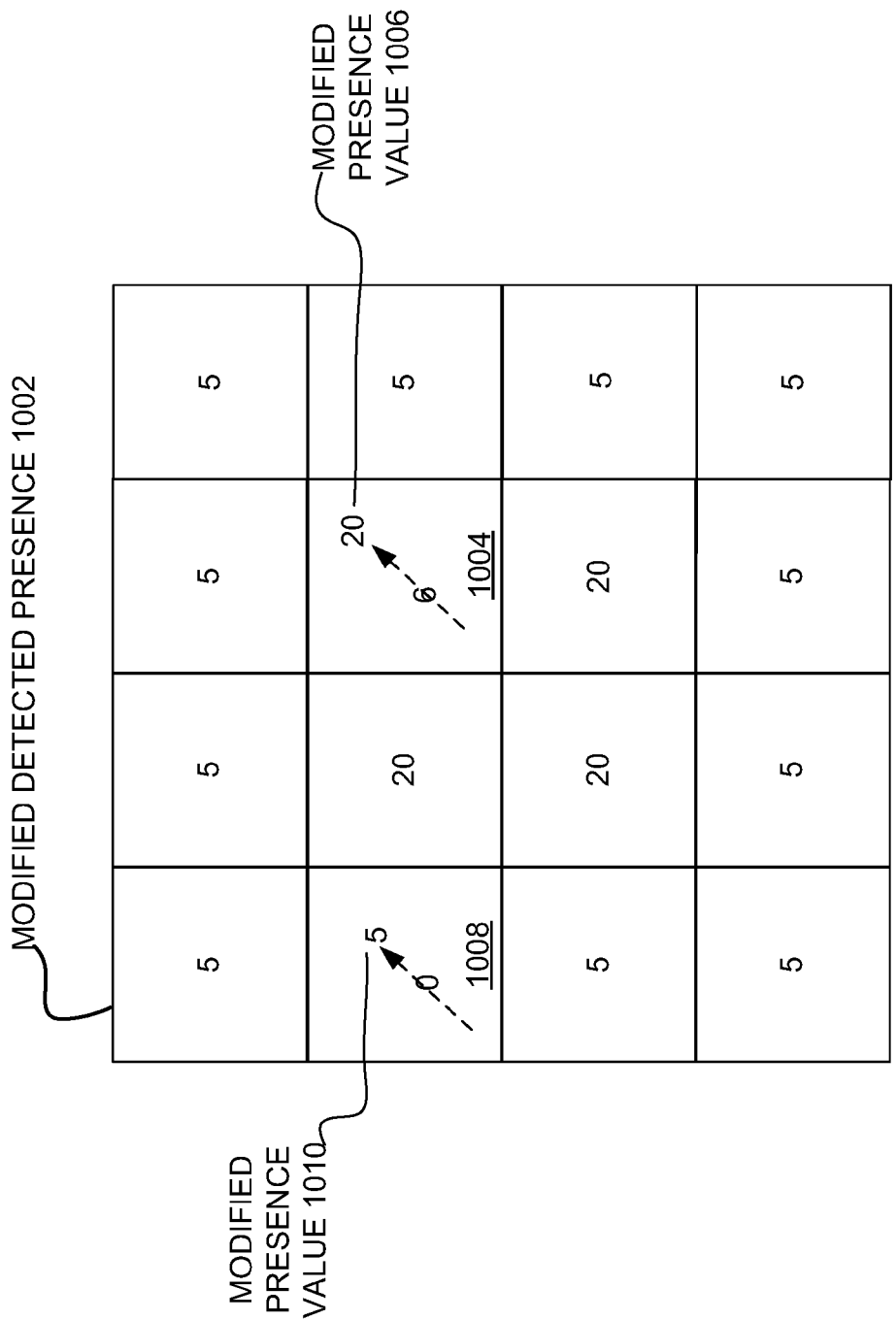
FIG. 10 is a block diagram illustrating a modified detected presence, in accordance with an embodiment.

FIG. 10 is a block diagram illustrating a modified detected presence 1002, in accordance with an embodiment. The modified detected presence 1002 of FIG. 10 is a modified version of the detected presence 802 of FIG. 8. In an embodiment, for each presence value found by the presence evaluator 226 to be in error, the presence adjustor 228 determines a modified presence value that would yield the pattern of reference difference values 700 of FIG. 7, rather than the pattern of determined difference values 900 of FIG. 9.

For example, the presence adjustor 228 may modify a presence value of six to a modified presence value 1006 of 20 as shown the region 1004. This modification results in a change in difference values of the circle 902 of FIG. 9 from 14 to zero, as in the circle 702 of the pattern of reference difference values 700 in FIG. 7. The modification also results in a change of difference values of the circle 908 of FIG. 9 from one to 15, as in the circle 704 of the pattern of reference difference values 700 in FIG. 7. The presence adjustor 228 may also modify a presence value of zero to a modified presence value 1010 of five, as shown in the region 1008 of FIG. 10. This modification results a change in difference value of the circle 908 of FIG. 9 from 20 to 15, as in the circle 704 of the pattern of reference difference values 700 in FIG. 7. In this way, the modified detected presence 1002 can mitigate the effect of noise or other error in a detected presence.

Figure 11:
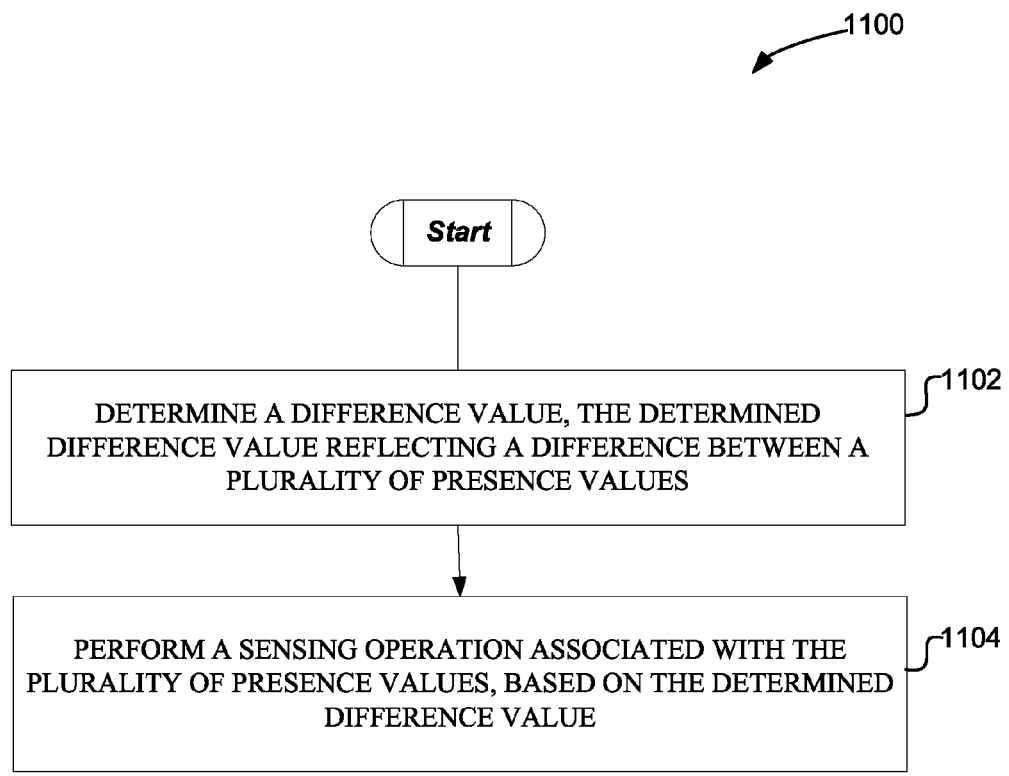
FIG. 11 is a flow diagram illustrating a method of performing a detection operation, in accordance with an embodiment.

FIG. 11 is a flow diagram illustrating a method 1100 of performing a detection operation, in accordance with an embodiment. A description of the method 1100 refers to components of drawings described above for the purpose of explanation and not to limit the claimed subject matter. It will be noted that the methods described herein may be performed by hardware, software, or a combination of hardware and software.

At block 1102, the method 1100 includes determining a difference value, the determined difference value reflecting a difference between a plurality of presence values. At block 1104, the method 1100 includes performing an operation associated with the plurality of presence values, based on the determined difference value.

In an embodiment, the presence evaluator 226 of FIG. 2 identifies a level of similarity between a difference value determined by the difference module 225 of FIG. 2 and a reference difference value. The presence adjustor 228 of FIG. 2 may then filter or modify a presence value, based on the identified level of similarity.

For example, the presence adjustor 228 may filter out, as noise, the presence value 404 of FIG. 4, if the identified level of similarity between the difference value 408 of FIG. 4 and the difference value 316 of FIG. 3 does not meet or exceed (e.g., or fall within a range) a threshold level of similarity. Alternatively or additionally, the presence adjustor 228 may modify the presence value 504 of FIG. 5 if the identified level of similarity between the difference value 504 of FIG. 5 and the difference value 316 of FIG. 3 does not meet or exceed a threshold level of similarity. In an embodiment, the modified presence value 505 of FIG. 5 results in a modified difference value 517 of FIG. 5, and a level of similarity between the modified difference value 517 of FIG. 5 and the reference difference value 316 of FIG. 3 meets or exceeds the threshold level of similarity.

The difference module 225 of FIG. 2 may determine a pattern of determined difference values such as the pattern of determined difference values 524 of FIG. 5 and the pattern of determined difference values 900 of FIG. 9. The presence evaluator 226 of FIG. 2 may identify a level of similarity between the pattern of determined difference values and a pattern of reference difference values such as the pattern of reference difference values 324 of FIG. 3 and the pattern of reference difference values 700 of FIG. 7.

For example, the presence evaluator 226 may determine a first level of similarity (e.g., a match) between a first portion of the pattern of determined difference values 524 of FIG. 5 (e.g., including the difference values 518, 520, and 522) and a first portion of the pattern of reference difference values of FIG. 3 (e.g., including the difference values 318, 320, and 322) and identify a second level of similarity (e.g., not a match) between a second portion of the pattern of determined difference values (e.g., including the difference values 514 and 516) and a second portion of the pattern of reference difference values (e.g., including the difference values 314 and 316). By the same or similar technique, the presence evaluator 226 of FIG. 2 can detect that the difference values 904 and 906 of the pattern of determined difference values 900 in the circle 902 of FIG. 9 do not follow the pattern of references difference values 700 in the circle 702 of FIG. 7.

In an embodiment, the presence adjustor 228 of FIG. 2 may filter out and/or modify the presence value 504 (e.g., or a different presence value) if the second level of similarity does not meet or exceed a threshold level of similarity. For another example, FIG. 10 shows a region 1004, where the presence adjustor 228 of FIG. 3 has modified the presence value in the region 602 of FIG. 6 to the modified presence value 1006. Returning to FIG. 5, the modified presence value 505 results in a modified second portion of the pattern of determined difference values 524 (e.g., including the modified difference values 515 and 517) and the similarity between the modified second portion of the pattern of determined difference values 524 and the second portion of the pattern of reference difference values 324 of FIG. 3 (e.g., including the difference values 314 and 316) meets or exceeds the threshold level of similarity.

Through embodiments described herein, presence values affected by noise are filtered out or modified in accordance with anticipated presence values. More accurate presence values provide more accurate presence detection of an input object. The more accurate detected presence described herein can then be used by the position module 224 to calculate a more accurate position of the input object.

Figure 12:
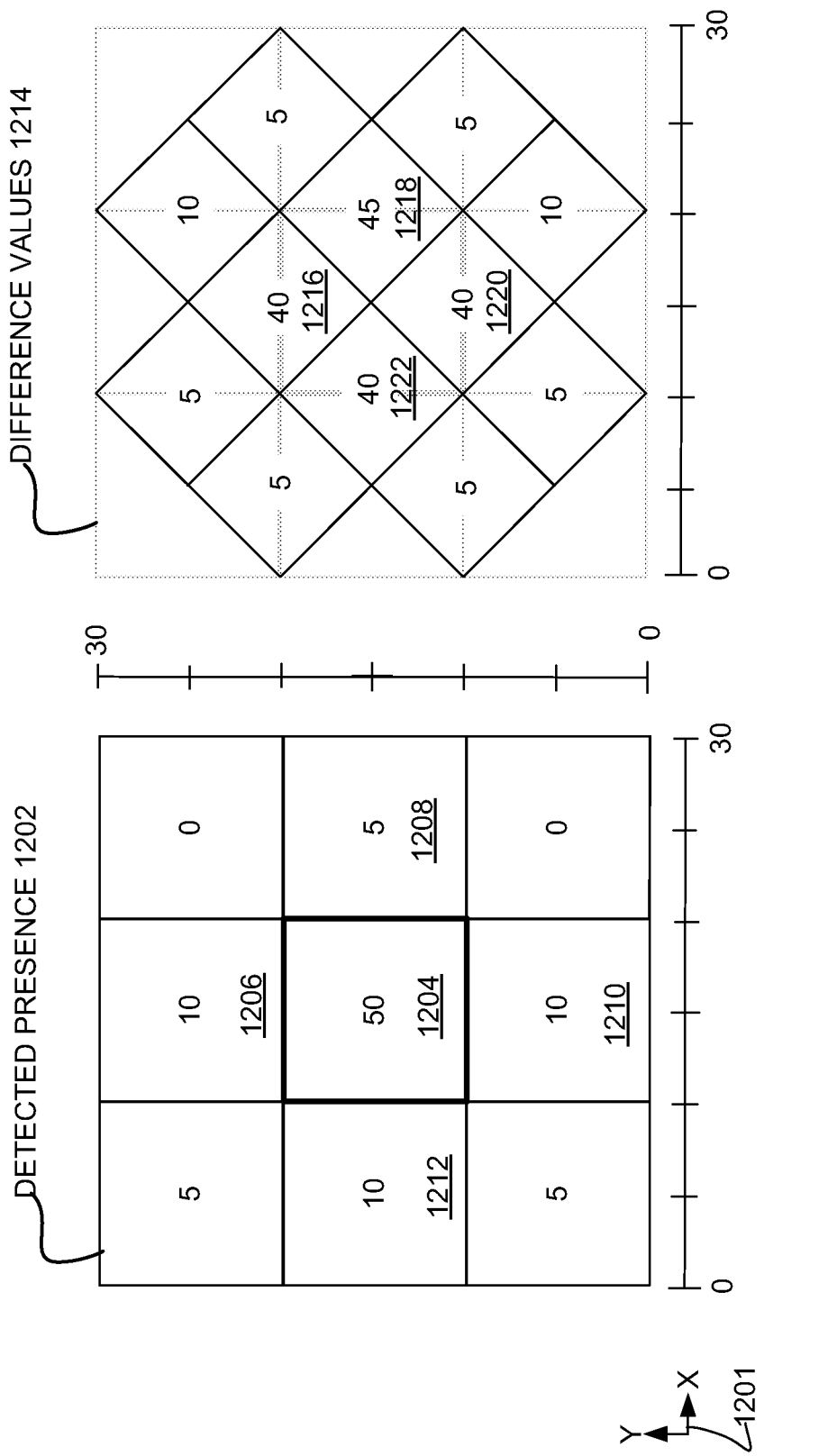
FIG. 12 is a block diagram illustrating yet another detected presence and corresponding difference values, in accordance with an embodiment.

FIG. 12 is a block diagram illustrating yet another detected presence 1202 and corresponding difference values 1214, in accordance with an embodiment. FIG. 12 is shown to include the detected presence 1202, difference values 1214 of the detected presence 1202, and their relationships to an x-y-axis 1201. The detected presence 1202 is shown to be three regions wide (e.g., 30 units along the x-axis) and shown to be three regions high (e.g., 30 units on the y-axis). The sub-regions (e.g., including the sub-regions 1216, 1218, 1220, and 1222) of the difference values 1214 reside within the outline of the detected presence 1202. The region 1204 is shown to share the sub-regions with adjacent regions 1206, 1208, 1210, and 1212. Although regions of the detected presence 1202 are shown to intersect with up to four sub-regions, in other embodiments, each region may intersect with greater than or fewer than four sub-regions without departing from the claimed subject matter.

The detected presence 1202 is shown to include the relatively larger presence value of 50 in the region 1204 than the relatively smaller presence values of the adjacent regions 1206, 1208, 1210, and 1212. The relatively larger presence value of the region 1204 may indicate a position of the finger 110 of FIG. 1 between 10 and 20 units on the x-axis and at 15 units on the y-axis, however, more precision may be appropriate in some applications.

In an embodiment, the position module 224 of FIG. 2 determines the x-y position of the finger within the region 1204 of FIG. 12 through difference values determined by the difference module 225 of FIG. 2. For example, the difference module 225 may determine that the differences between the relatively large presence value of 50 in the region 1204 and the presence value of the adjacent regions 1206, 1208, 1210, and 1212 are 40, 45, 40, and 40, respectively. In an embodiment, the difference module 225 places those difference values in the sub-regions 1216, 1218, 1220, and 1222, respectively.

The position module 224 of FIG. 2 may select one of the sub-regions as the position of the finger 110 or select that sub-region to divide into further sub-regions. In either event, the position module 224 may select the sub-region near the strongest presence value. For example, on the x-axis, the position of the finger 110 may be more likely to be near the region 1212, which has the presence value of 10, than near the region 1208, which has the presence value of 5. On the y-axis, the position of the finger 110 may likely be equidistant to the regions 1206 and 1210, which have equal presence values of 10. Based on this example, the position module 224 may determine the position of the finger 110 of FIG. 1 to be centered in the sub-region 1212, which is at 10, on the x-y axis 1201.

Alternatively or additionally, the position module 224 of FIG. 2 may select the sub-region 1212 of FIG. 12 to be divided, by the difference module 225 of FIG. 2, into further sub-regions in order to determine a more precise position. With respect to FIG. 13, further sub-regions are introduced that include differences between the difference value 40 of the sub-region 1212 and the difference values of adjacent sub-regions.

Figure 13:
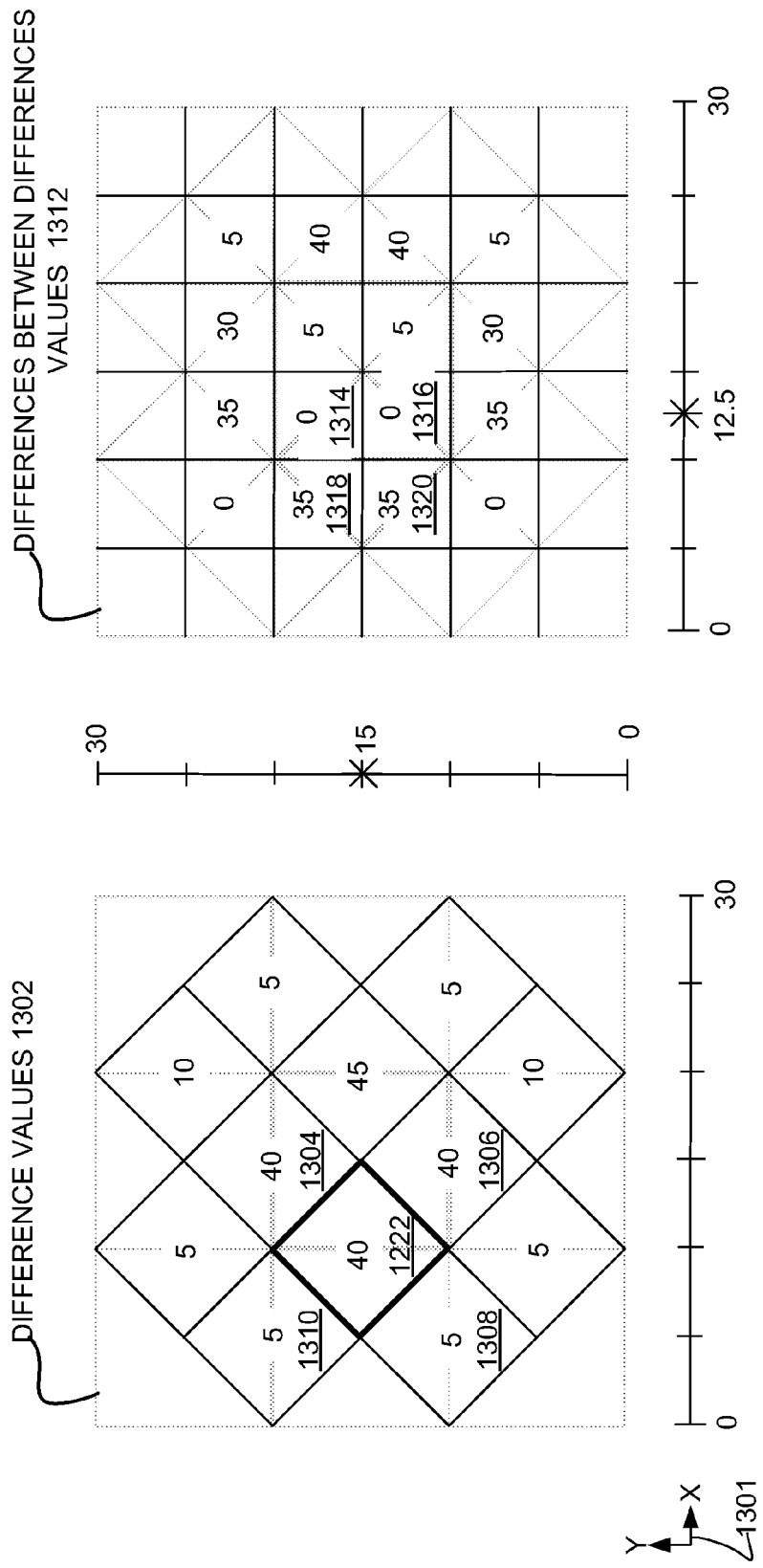
FIG. 13 is a block diagram illustrating differences between the corresponding difference values, in accordance with an embodiment.

FIG. 13 is a block diagram illustrating differences between the corresponding difference values of FIG. 12, in accordance with an embodiment. The difference values 1302 are shown to include the difference value 40 of the sub-region 1222 (e.g., the selected sub-region), and the difference values of 40, 40, 5, and 5 of the sub-regions 1304, 1306, 1308, and 1310, respectively. Example differences between difference values 1312 are now discussed.

In an embodiment, the difference module 225 of FIG. 2 determines that the differences between the difference value 40 of the sub-region 1222 and the difference values of the adjacent sub-regions 1304, 1306, 1308, and 1310 are 0, 0, 35, and 35, respectively. In an embodiment, the difference module 225 of FIG. 2 places or assigned the difference values of 0, 0, 35, and 35 in the further sub-regions 1314, 1316, 1318, and 1320, respectively.

The position module 224 of FIG. 2 may select one or more of the further sub-regions 1314, 1316, 1318, and 1320 to determine the position of the finger 110 of FIG. 1. For example, the position module 224 may determine that the position of the finger 110 is at one or more of the further sub-regions that have a minimum difference between difference values. In the example of FIG. 13, the position module 224 determines the position of the finger 110 to be centered between the further sub-regions 1314 and 1316, which position is at 12.5, 15 on the x-y axis 1301. Alternatively or additionally, the difference module 225 may continue to recursively divide a selected further sub-region into yet further sub-regions to identify a potentially more precise position of the finger 110.

Determining the position through differences between presence values and/or differences between difference values may be accomplished through subtraction or addition computations without having to execute division or multiplication computations. In an embodiment, position calculations described herein, which may avoid division and/or multiplication computations, are faster and less energy consuming than position calculations requiring division and/or multiplication computation.

Figure 14:
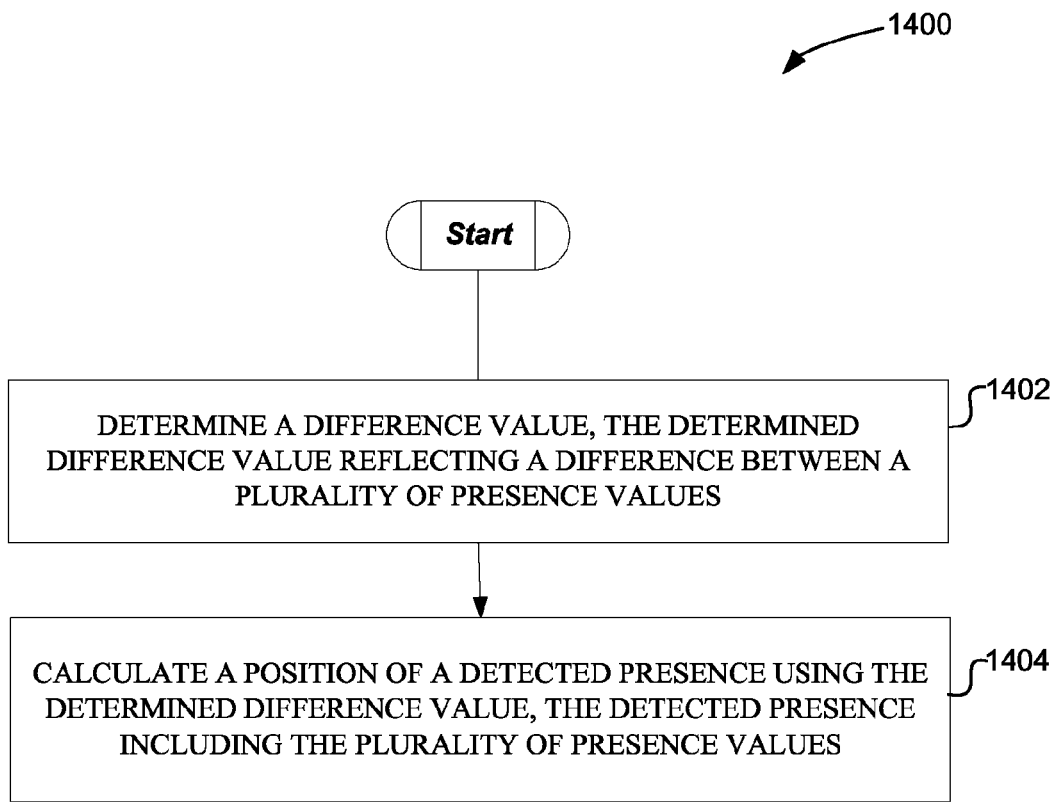
FIG. 14 is a flow diagram illustrating a method for determining a position of a detected presence, in accordance with an embodiment.

FIG. 14 is a flow diagram illustrating a method for determining a position of a detected presence, in accordance with an embodiment. A description of the method 1400 refers to components of drawings referred to above for the purpose of explanation and not to limit the claimed subject matter. It will be noted that the methods described herein may be performed by hardware, software, or a combination of hardware and software.

At block 1402, the method 1400 includes determining a difference value, the determined difference value reflecting a difference between a plurality of presence values. At block 1404, the method 1400 includes calculating a position of a detected presence using the determined difference value, the detected presence including the plurality of presence values.

For example, referring again to FIG. 12, the difference module 225 of FIG. 2 determines difference values for the sub-regions 1216, 1218, 1220, and 1222 reflecting the difference between the presence values in the regions 1204, 1206, 1208, 1210, and 1212, respectively. Now referring to FIG. 13, in an embodiment, the difference module 225 of FIG. 2 determines further difference values shown in the further sub-regions 1314, 1316, 1318, and 1320 of FIG. 13. These further difference values reflect differences between the determined difference values of the sub-regions 1222, 1304, 1306, 1308, and 1310. In an embodiment, the position module 224 determines that the position of the detected presence 1202 is centered to the further sub-regions 1314 and 1316 because the differences between difference values are at a minimum at those locations. In other embodiments, the further sub-regions (e.g., the sub-region 1314) can be further divided as part of a recursive process for determining minimum difference values that indicate position.

The process for position determination described above may be less computationally expensive and more quickly executed than other methods of position calculation such as centroid equations that require division. For example, the position determination described above can be provided through subtraction (e.g., to determine difference values) and without the use of division.

Figure 15:
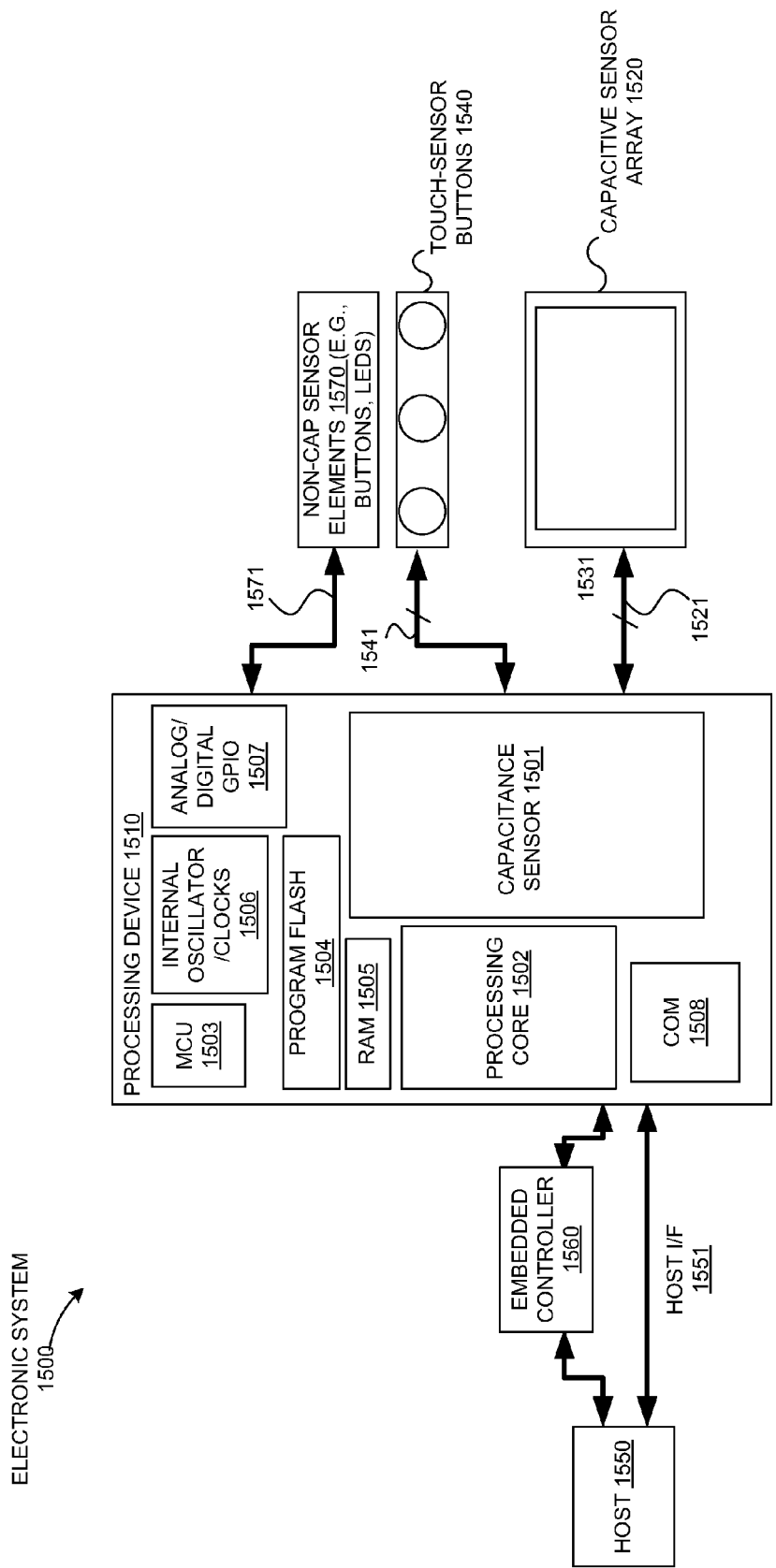
FIG. 15 is a block diagram illustrating an electronic system to detect a presence of a conductive object on a capacitive sensor array, in accordance with various embodiments.

FIG. 15 is a block diagram illustrating an electronic system 1500 to detect a presence of a conductive object on a capacitive sensor array 1520, in accordance with various embodiments.

The electronic system 1500 includes a processing device 1510, the capacitive sensor array 1520, touch-sensor buttons 1540, host processor 1550, embedded controller 1560, and non-capacitance sensor elements 1570. The processing device 1510 may include analog and/or digital general purpose input/output ("GPIO") ports 1507. GPIO ports 1507 may be programmable. The digital block array may be configured to implement a variety of digital logic circuits (e.g., DACs, digital filters, or digital control systems) using, in one embodiment, configurable user modules ("UMs"). The digital block array may be coupled to a system bus. Processing device 1510 may also include memory, such as random access memory ("RAM") 1505 and program flash 1504. RAM 1505 may be static RAM ("SRAM"), and program flash 1504 may be a non-volatile storage, which may be used to store firmware (e.g., control algorithms executable by processing core 1502 to implement operations described herein). The memory may include instructions that when executed perform the method described herein. Processing device 1510 may also include a microcontroller unit ("MCU") 1503 coupled to memory and the processing core 1502.

As illustrated, capacitance sensor 1501 may be integrated into processing device 1510. Capacitance sensor 1501 may include analog I/O for coupling to an external component, such as capacitive sensor array 1520, touch-sensor buttons 1540, and/or other devices. Capacitance sensor 1501 and processing device 1510 are described in more detail below.

The embodiments described herein can be used in any capacitive sensor array application, for example, the capacitive sensor array 1520 may be a touch screen, a touch-sensor slider, or touch-sensor buttons 1540 (e.g., capacitance sensor buttons). The operations described herein may include, but not be limited to, notebook pointer operations, lighting control (dimmer), volume control, graphic equalizer control, speed control, or other control operations requiring gradual or discrete adjustments. It will also be noted that these embodiments of capacitive sense implementations may be used in conjunction with non-capacitive sensor elements 1570, including but not limited to pick buttons, sliders (ex. display brightness and contrast), scroll-wheels, multi-media control (ex. volume, track advance, etc) handwriting recognition and numeric keypad operation.

In one embodiment, the electronic system 1500 includes a capacitive sensor array 1520 of sensor elements coupled to the processing device 1510 via bus 1521. In an embodiment, the capacitive sensor array may include sensor elements 104 of FIG. 1. The capacitive sensor array 1520 of the sensor elements may include a one-dimensional sensor array in one embodiment and a two dimensional sensor array in another embodiment. Alternatively or additionally, the capacitive sensor array 1520 of the sensor elements may have more dimensions. The capacitive sensor array 1520 may employ projected capacitive technology in which the capacitive sensor elements of the capacitive sensor array are formed in one or more capacitive sensor layers upon a substrate (not shown) of the capacitive sensor array 1520. For example, the capacitive sensor elements may be patterned over an image display (e.g., a liquid crystal display) in one or more layers of transparent conducting film deposited on a glass substrate. A protective transparent layer (e.g., glass or plastic film) may cover the capacitive sensor elements to shield them from environmental damage.

Also, in one embodiment, the capacitive sensor array 1520 of the sensor elements may be sliders, touchpads, touch screens or other sensing devices. In another embodiment, the electronic system 1500 includes touch-sensor buttons 1540 coupled to the processing device 1510 via bus 1541. Touch-sensor buttons 1540 may include a single-dimension or multi-dimension sensor array. The single- or multi-dimension sensor array may include multiple sensor elements. For a touch-sensor button, the sensor elements may be coupled together to detect a presence of a conductive object over the entire surface of the sense device. Alternatively, the touch-sensor buttons 1540 may have a single sensor element to detect the presence of the conductive object. In one embodiment, touch-sensor buttons 1540 may include a capacitive sensor element. Capacitive sensor elements may be used as non-contact sensor elements. These sensor elements, when protected by an insulating layer, offer resistance to severe environments.

The electronic system 1500 may include any combination of one or more of the capacitive sensor array 1520, and/or touch-sensor button 1540. In another embodiment, the electronic system 1500 may also include non-capacitance sensor elements 1570 coupled to the processing device 1510 via bus 1571. The non-capacitance sensor elements 1570 may include buttons, light emitting diodes ("LEDs"), and other user interface devices, such as a mouse, a keyboard, or other functional keys that do not require capacitance sensing. In one embodiment, busses 1571, 1541, 1531, and 1521 may be a single bus. Alternatively, these buses may be configured into any combination of one or more separate buses.

Processing device 1510 may include internal oscillator/clocks 1506 and communication block ("COM") 1508. The oscillator/clocks block 1506 provides clock signals to one or more of the components of processing device 1510. Communication block 1508 may be used to communicate with an external component, such as a host processor 1550, via host interface ("I/F") line 1551. Alternatively, processing device 1510 may also be coupled to the embedded controller 1560 to communicate with the external components, such as host processor 1550. In one embodiment, the processing device 1510 is configured to communicate with the embedded controller 1560 or the host processor 1550 to send and/or receive data.

Processing device 1510 may reside on a common carrier substrate such as, for example, an integrated circuit ("IC") die substrate, a multi-chip module substrate, or the like. Alternatively, the components of processing device 1510 may be one or more separate integrated circuits and/or discrete components. In one exemplary embodiment, processing device 1510 may be the Programmable System on a Chip ("PSoC®") processing device, developed by Cypress Semiconductor Corporation, San Jose, Calif. Alternatively, processing device 1510 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It will also be noted that the embodiments described herein are not limited to having a configuration of a processing device coupled to the host processor 1550, but may include a system that measures the capacitance on the sense device and sends the raw data to another host computer where it is analyzed by an application. In effect, the processing that is done by processing device 1510 may also be done in the host computer.

It is noted that the processing device 1510 of FIG. 15 may measure capacitance using various techniques, such as self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as added by the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth). In some embodiments, the processing device 1510 may provide multi-touch capability through simultaneously detecting multiple conductive objects proximate to different regions of the capacitive sensor array 1520. In an embodiment, the processing device 1510 may include and/or provide the functionality of one or more of the sensing module 106 of FIG. 1 and/or the signal sensor 220, the presence detector 222, the position module 224, the difference module 225, the presence evaluator 226, and the presence adjustor 228 as described above.

Capacitance sensor 1501 may be integrated into the IC of the processing device 1510, or alternatively, in a separate IC. The capacitance sensor 1501 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of capacitance sensor 1501 may be generated and compiled for incorporation into other integrated circuits. For example, behavioral level code describing capacitance sensor 1501, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 1501.

It will be noted that the components of the electronic system 1500 may include only some or all the discrete components described above, or some combination thereof.

In one embodiment, electronic system 1500 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

Methods and apparatus to perform a detection operation have been described. Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document controls.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
    at a sensing module coupled to a capacitive sense array including a first sensor element and a second sensor element that is adjacent to the first sensor element:
        obtaining a first plurality of presence values associated with a first detected touch presence of an input object, the first plurality of presence values including a first presence value and an adjacent second presence value, wherein the first presence value is associated with a change in capacitance of the first sensor element, and the second presence value is associated with a change in capacitance of the second sensor element;
        determining a reference difference value between the first presence value and the second presence value, wherein the reference difference value corresponds to the first detected touch presence of the input object associated with the first and second sensor elements;
        obtaining a second plurality of presence values associated with a second detected touch presence, the second plurality of presence values including a third presence value and an adjacent fourth presence value, wherein the third presence value is associated with a change in capacitance of the first sensor element, and the fourth presence value is associated with a change in capacitance of the second sensor element;

determining a first difference value between the third presence value and the fourth presence value;

computing a first level of similarity between the first difference value and the reference difference value; and when the computed first level of similarity is below a predetermined threshold level of similarity, performing one or more operations selected from the group consisting of: filtering out, as noise, at least one presence value of the second plurality of presence values, and modifying at least one presence value of the second plurality of presence values.

2. The method of claim 1, further comprising:

determining a second difference value, the determined second difference value reflecting a difference between a third plurality of presence values of the second detected touch presence, wherein each presence value of the third plurality of presence values represents a change in capacitance of one or more corresponding sensor elements;

determining a first pattern of difference values associated with the second detected touch presence, the first pattern of difference values including the first difference value and the second difference value;

computing a second level of similarity between the first pattern of difference values and a reference pattern of difference values; and when the computed second level of similarity is below the predetermined threshold level of similarity, filtering out, as noise, at least one presence value associated with the first pattern of difference values.

3. The method of claim 1, further comprising:

determining a second difference value, the determined second difference value reflecting a difference between a third plurality of presence values of the second detected touch presence, wherein each presence value of the third plurality of presence values represents a change in capacitance of one or more corresponding sensor elements;

determining a first pattern of difference values associated with the second detected touch presence, the first pattern of difference values including the first difference value and the second difference value;

computing a second level of similarity between a first portion of the first pattern of difference values and a first portion of a reference pattern of difference values, and determining that the second level of similarity meets or exceeds the threshold level of similarity;

computing a third level of similarity between a second portion of the first pattern of difference values and a second portion of a reference pattern of difference values; and in accordance with a determination that the third level of similarity is below the predetermined threshold level of similarity, modifying at least one presence value associated with the second portion of the first pattern of difference values, wherein modifying the at least one presence value results in a modified second portion of the first pattern of difference values, and wherein the modified second portion of the first pattern of difference values and the second portion of the reference pattern of difference values result in the third level of similarity that meets or exceeds the threshold level of similarity.

4. The method of claim 1, further comprising calculating a position of the second detected touch presence that uses the second plurality of presence values.

5. The method of claim 4, further comprising:

determining a second difference value, the determined second difference value reflecting a difference between a third plurality of presence values of the second detected touch presence, wherein each presence value of the third plurality of presence values represents a change in capacitance of one or more corresponding sensor elements; and determining a third difference value, the third difference value reflecting a difference between the first difference value and the second difference value, wherein the position of the second detected touch presence is determined based on the third difference value.

6. A sensing module coupled to a capacitive sense array including a first sensor element and a second sensor element that is adjacent to the first sensor element, comprising:

a difference module configured to:

obtain a first plurality of presence values associated with a first detected touch presence of an input object, the first plurality of presence values including a first presence value and an adjacent second presence value, wherein the first presence value is associated with a change in capacitance of the first sensor element, and the second presence value is associated with a change in capacitance of the second sensor element; and determine a reference difference value between the first presence value and the second presence value, wherein the reference difference value corresponds to the first detected touch presence of the input object associated with the first and second elements;

obtain a second plurality of presence values associated with a second detected touch presence, the second plurality of presence values including a third presence value and an adjacent fourth presence value, wherein the third presence value is associated with a change in capacitance of the first sensor element, and the fourth presence value is associated with a change in capacitance of the second sensor element; and determine a first difference value between the third presence value and the fourth presence value;

a presence evaluator configured to:

obtain the reference difference value corresponding to the first detected touch presence associated with the first and second sensor elements; and compute a first level of similarity between the first difference value and the reference difference value; and a presence adjustor configured to perform one or more operations when the computed first level of similarity is below a predetermined threshold level of similarity, wherein the one or more operations are selected from the group consisting of: filtering out, as noise, at least one presence value of the second plurality of presence values, and modifying at least one presence value of the second plurality of presence values.

7. The sensing module of claim 6, wherein:

the difference module is configured to determine a second difference value, the determined second difference value reflecting a difference between a third plurality of presence values of the second detected touch, wherein each presence value of the third plurality of presence values represents a change in capacitance of one or more corresponding sensor elements, and determine a first pattern of difference values associated with the second detected touch presence, the first pattern of difference values including the first difference value and the second difference value;

the presence evaluator is configured to compute a second level of similarity between the first pattern of difference values and a reference pattern of difference values; and the presence adjustor is configured to filter out at least one presence value associated with the first pattern of difference values when the computed level of similarity is below the predetermined threshold level of similarity.

8. The sensing module of claim 6, wherein:

the difference module is configured to determine a second difference value, the determined second difference value reflecting a difference between a third plurality of presence values of the second detected touch presence, wherein each presence value of the third plurality of presence values represents a change in capacitance of one or more corresponding sensor elements;

the difference module is further configured to determine a first pattern of difference values associated with the second detected touch presence, the first pattern of difference values including the first difference value and the second difference value;

the presence evaluator is configured to:

compute a second level of similarity between a first portion of the first pattern of difference values and a first portion of a reference pattern of difference values, and determine that the second level of similarity meets or exceeds the threshold level of similarity, and to compute a third level of similarity between a second portion of the first pattern of difference values and a second portion of a reference pattern of difference values; and the presence adjustor is configured to, in accordance with a determination that the third level of similarity is below the predetermined threshold level of similarity, modify at least one presence value associated with the second portion of the first pattern of difference values, wherein modifying at least one presence value results in a modified second portion of the first pattern of difference values, and wherein the modified second portion of the first pattern of difference values and the second portion of the reference pattern of difference values result in the third level of similarity that meets or exceeds the threshold level of similarity.

9. The sensing module of claim 6, further including a position module to calculate a position of the second detected touch presence using the second plurality of presence values.

10. The sensing module of claim 9, wherein:

the difference module is configured to determine a second difference value, the determined second difference value reflecting a difference between a third plurality of presence values of the second detected touch presence, wherein each presence value of the third plurality of presence values represents a change in capacitance of one or more corresponding sensor elements; and the difference module is configured to determine a third difference value, the third difference value reflecting a difference between the first difference value and the second difference value, wherein the position module is configured to calculate the position of the second detected touch presence using the third difference value.

11. A sensing system comprising:

a processing device;

a memory coupled with the processing device; and a capacitive sense array including a first sensor element and a second sensor element that is adjacent to the first sensor element, the capacitive sense array coupled with the processing device, the processing device comprising:

a difference module configured to:

obtain a first plurality of presence values associated with a first detected touch presence of an input object, the first plurality of presence values including a first presence value and an adjacent second presence value, wherein the first presence value is associated with a change in capacitance of the first sensor element, and the second presence value is associated with a change in capacitance of the second sensor element; and determine a reference difference value between the first presence value and the second presence value, wherein the reference difference value corresponds to the first detected touch presence of the input object associated with the first and second elements;

obtain a second plurality of presence values associated with a second detected touch presence, the second plurality of presence values including a third presence value and an adjacent fourth presence value, wherein the third presence value is associated with a change in capacitance of the first sensor element, and the fourth presence value is associated with a change in capacitance of the second sensor element;

determine a first difference value between the third presence value and the fourth presence value;

a presence evaluator configured to:

obtain the reference difference value corresponding to the first detected touch presence associated with the first and second sensor elements; and compute a first level of similarity between the first difference value and the reference difference value; and a presence adjustor configured to perform one or more operations when the computed first level of similarity is below a predetermined threshold level of similarity, wherein the one or more operations are selected from the group consisting of: filtering out, as noise, at least one presence value of the second plurality of presence values, and modifying at least one presence value of the second plurality of presence values.

12. The sensing system of claim 11, wherein:

the difference module is configured to determine a second difference value, the determined second difference value reflecting a difference between a third plurality of presence values of the second detected touch presence, wherein each presence value of the third plurality of presence values represents a change in capacitance of one or more corresponding sensor elements, and configured to determine a first pattern of difference values associated with the second detected touch presence, the first pattern of difference values including the first difference value and the second difference value;

the presence evaluator is configured to compute a second level of similarity between the first pattern of difference values and a reference pattern of difference values; and the presence adjustor is configured to filter out at least one presence value associated with the first pattern of difference values when the computed level of similarity is below the predetermined threshold level of similarity.

13. The sensing system of claim 11, wherein:
the difference module is configured to determine a second difference value, the determined second difference value reflecting a difference between a third plurality of presence values of the second detected touch presence, wherein each presence value of the third plurality of presence values represents a change in capacitance of one or more corresponding sensor elements;
the difference module is further configured to determine a first pattern of difference values associated with the second detected touch presence, the first pattern of difference values including the first difference value and the second difference value;
the presence evaluator is configured to:
compute a second level of similarity between a first portion of the first pattern of difference values and a first portion of a reference pattern of difference values, and determine the second level of similarity meets or exceeds the threshold level of similarity; and
compute a third level of similarity between a second portion of the first pattern of difference values and a second portion of a reference pattern of difference values; and
the presence adjustor is configured to, in accordance with a determination that the third level of similarity is below the predetermined threshold level of similarity, modify at least one presence value associated with the second portion of the first pattern of difference values, wherein modifying at least one presence value results in a modified second portion of the first pattern of difference values, and wherein the modified second portion of the first pattern of difference values and the second portion of the reference pattern of difference values result in the third level of similarity that meets or exceeds the threshold level of similarity.

14. The sensing system of claim 11, further including a position module to calculate a position of the second detected touch presence using the second plurality of presence values.

15. The sensing system of claim 14, wherein:
the difference module is configured to determine a second difference value, the determined second difference value reflecting a difference between a third plurality of presence values of the second detected touch presence, wherein each presence value of the third plurality of presence values represents a change in capacitance of one or more corresponding sensor elements; and
the difference module is configured to determine a third difference value, the third difference value reflecting a difference between the first difference value and the second difference value, wherein the position module is configured to calculate the position of the second detected touch presence using the third difference value.

* * * * *